(12) United States Patent
Stewart

(10) Patent No.: US 8,109,145 B2
(45) Date of Patent: Feb. 7, 2012

(54) MICRO HEMISPHERIC RESONATOR GYRO

(75) Inventor: Robert E. Stewart, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 1225 days.

(21) Appl. No.: 11/888,163

(22) Filed: Jul. 31, 2007

(65) Prior Publication Data

US 2009/0031831 A1    Feb. 5, 2009

(51) Int. Cl.
*G01P 9/04* (2006.01)
*G01C 19/56* (2006.01)

(52) U.S. Cl. .................. 73/504.13; 73/504.12

(58) Field of Classification Search ............. 73/504.13, 73/504.12, 504.04
See application file for complete search history.

(56) References Cited

U.S. PATENT DOCUMENTS

| | | | | |
|---|---|---|---|---|
| 3,680,391 A * | 8/1972 | Denis | ........................ | 73/504.13 |
| 4,157,041 A * | 6/1979 | Loper et al. | ................ | 73/504.13 |
| 6,105,427 A * | 8/2000 | Stewart et al. | ............. | 73/514.32 |
| 6,289,733 B1 * | 9/2001 | Challoner et al. | ......... | 73/504.12 |
| 6,308,569 B1 * | 10/2001 | Stewart | ..................... | 73/514.32 |
| 6,374,672 B1 * | 4/2002 | Abbink et al. | ............. | 73/504.12 |
| 6,595,056 B2 * | 7/2003 | Stewart | ..................... | 73/514.29 |
| 6,662,656 B2 * | 12/2003 | Jeanroy | ..................... | 73/504.02 |
| 6,928,874 B2 * | 8/2005 | Painter et al. | .............. | 73/504.13 |
| 7,426,860 B2 * | 9/2008 | Stewart | ..................... | 73/504.13 |
| 7,526,957 B2 * | 5/2009 | Watson | ...................... | 73/504.13 |
| 7,581,443 B2 * | 9/2009 | Kubena et al. | ............. | 73/504.12 |
| 7,617,727 B2 * | 11/2009 | Watson | ...................... | 73/504.13 |
| 7,637,156 B2 * | 12/2009 | Araki et al. | ................ | 73/504.13 |
| 7,818,871 B2 * | 10/2010 | Shcheglov | ................... | 29/592.1 |
| 2005/0017329 A1 * | 1/2005 | Hayworth et al. | ........... | 257/659 |
| 2007/0017287 A1 | 1/2007 | Kubena et al. | | |

FOREIGN PATENT DOCUMENTS

| | | |
|---|---|---|
| EP | 0 175 508 A | 3/1986 |
| EP | 1 775 551 A | 4/2007 |

* cited by examiner

*Primary Examiner* — Helen C. Kwok
(74) *Attorney, Agent, or Firm* — Carmen Patti Law Group, LLC

(57) ABSTRACT

One embodiment is a micro hemispheric resonator gyro having: a plurality of pickoff and forcer electrodes; a hemispheric resonator; a guard ring having first and second opposed sides, the guard ring containing the plurality of pickoff and forcer electrodes, and the hemispheric resonator; a top cover operatively coupled to the first side of the guard ring; and a bottom cover operatively coupled to the second side of the guard ring; wherein the plurality of pickoff and forcer electrodes, the hemispheric resonator, the guard ring, the top cover and the bottom cover form a micro hemispheric resonator gyro.

16 Claims, 6 Drawing Sheets

| CASE | DIAMETER (μM) | THICKNESS (μM) | FUNDAMENTAL BREATHING MODE (Hz) |
|---|---|---|---|
| 1 | 200 | 0.5 | 82432 |
| 2 | 200 | 1.5 | 204704 |
| 3 | 200 | 3 | 382092 |
| 4 | 300 | 0.5 | 42790 |
| 5 | 300 | 1.5 | 96501 |
| 6 | 300 | 3 | 177055 |
| 7 | 500 | 0.5 | 18390 |
| 8 | 500 | 1.5 | 37511 |
| 9 | 500 | 3 | 67070 |

FIG. 5

F1=37021 Hz (ROTATE ABOUT Z)

F2=38477 Hz (ROTATE ABOUT X)

F3=39663 Hz (ROTATE ABOUT Y)

F4=82432 Hz, BREATHING MODE 1

F5=82687 Hz, BREATHING MODE 2

MICRO HEMISPHERIC RESONATOR GYRO

TECHNICAL FIELD

The invention relates generally to hemispheric resonator gyros (HRG) and, more particularly, to micro hemispheric resonator gyros (µHRG).

BACKGROUND

Hemispherical resonating gyroscopes belong to a group of vibrating gyroscopes that are used to measure angular rotation rate. Similar to spinning mass gyroscopes, these instruments use the Coriolis effect from a rotating frame of reference. The significant difference is that vibrating gyroscopes use the momentum of a resonating elastic structure instead of a spinning mass. The advantage of the vibrating gyroscopes is that they have no motors or bearings and have the potential for infinite service life without the need for maintenance.

A hemispheric resonator gyro with modified digital control electronics has successfully demonstrated self-calibration of gyro bias. Proposals have been submitted to DARPA for point and locate targeting systems based on this HRG sensor configuration (eight electrodes) and electronics architecture (interchange of drive and sense modes). While the current HRG has very high performance, its high cost and low angular rate range severely limit its applications.

Therefore, there is a need in the art for an improved hemispheric resonator gyro.

SUMMARY

One embodiment of the present method and apparatus encompasses an apparatus. The apparatus may comprise: a plurality of pickoff and forcer electrodes; a hemispheric resonator; a guard ring having first and second opposed sides, the guard ring encompassing the plurality of pickoff and forcer electrodes, and the hemispheric resonator; a top cover operatively coupled to the first side of the guard ring; and a bottom cover operatively coupled to the second side of the guard ring; wherein the plurality of pickoff and forcer electrodes, the hemispheric resonator, the guard ring, the top cover and the bottom cover form a micro hemispheric resonator gyro.

One embodiment of the present method and apparatus encompasses a method. The apparatus may comprise: applying and patterning resist on a first side of a center silicon wafer followed by isotropic etching to form hemispherical cavities; patterning and etching a second side of the center silicon wafer using deep reactive ion etching (DRIE) to form cylindrical holes that intersect the hemispherical cavities; growing over the entire center silicon wafer a conformal 1 µm thick sacrificial layer such as silicon dioxide; removing the sacrificial layer from both the first and second sides of the center silicon wafer using chemical mechanical polishing (GMP); coating the entire center wafer with low stress dielectric such as PECVD silicon nitride; depositing a thin layer of titanium and gold over the entire silicon wafer; patterning with a mask the titanium and gold coated dielectric on the second side of the center silicon wafer to thereby define the eight pickoff and forcer electrodes and the dielectric; removing the dielectric, titanium and gold film from the first side of the center silicon wafer by chemical mechanical polishing (CMP); bonding a top cover wafer with patterned getters to the first side of the center silicon wafer using gold eutectic bonding; etching the electrode pattern established on the second side of the center silicon wafer using DRIE; bonding a bottom cover wafer with silicon dioxide to the second side of the center silicon wafer using low temperature direct wafer fusion bonding; etching vias in the bottom cover, through the silicon dioxide and silicon nitride layers to expose contact areas on the eight pickoff and forcer electrodes and guard ring; etching another via through the bottom cover and silicon dioxide layer to expose a contact area on the titanium and gold film on the surface of the silicon nitride layer; and depositing aluminum, using a shadow mask, on contact areas for ohmic contacts.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

FIG. 5 is a graph depicting the fundamental breathing mode frequencies for different thickness and diameter of a micro hemispheric resonator gyro according to the present method and apparatus;

DETAILED DESCRIPTION

Embodiments of the present method and apparatus achieve a micro hemispheric resonator gyro that may be two orders of magnitude lower in cost and two orders of magnitude higher in angular rate range than that of a hemispheric resonator gyro.

Figure 1:
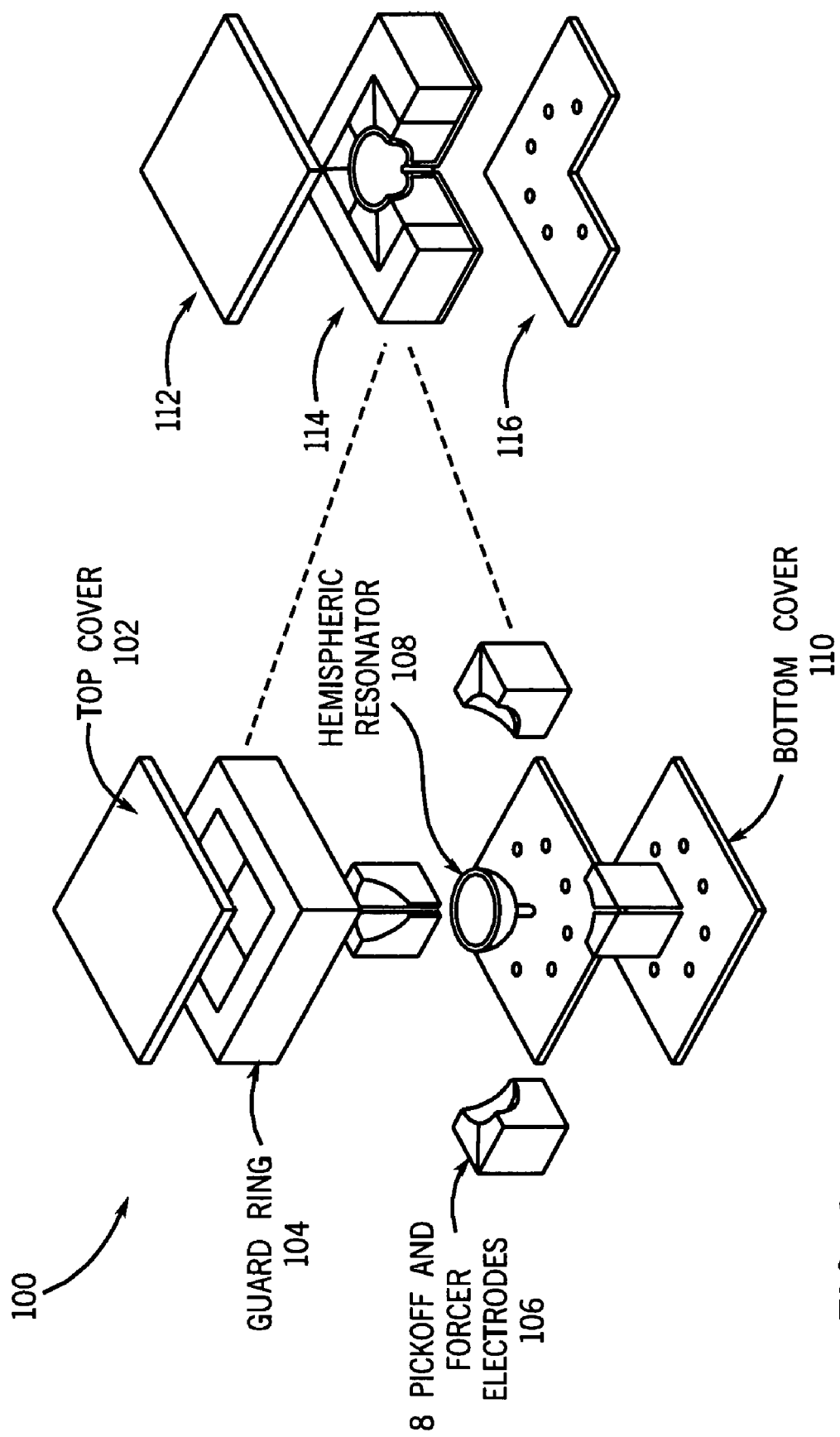
FIG. 1 depicts an embodiment according to the present method and apparatus of a micro hemispheric resonator gyro.

FIG. 1 depicts an embodiment according to the present method and apparatus of a micro hemispheric resonator gyro 100. The gyro 100 may be composed of a top cover 102, a guard ring 104, eight pickoff and forcer electrodes 106, a hemispheric resonator 108 and a bottom cover 110. All of these components except the hemispheric resonator 108 may be formed from single crystal silicon. The hemispheric resonator 108 may be formed from a high Q material, such as low stress silicon nitride. The micro hemispheric resonator gyro 100 may be composed of three silicon layers 112, 114, 116. The center layer 114 may contain the guard ring 104, the eight pickoff and forcer electrodes 106 and the hemispheric resonator 108. The top layer may contain the cover 102 and a getter (not shown), and the bottom layer may contain the bottom cover 110 with the vias (not shown) for electrical contact to the electrodes 106 and the resonator 108.

Figure 3:
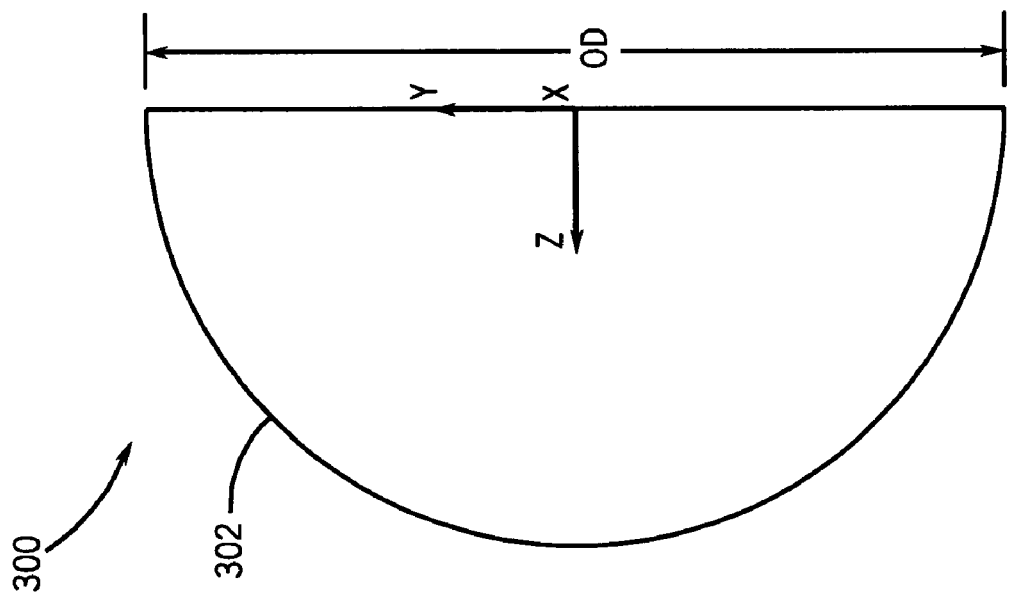
FIG. 3 is a side view of the FIG. 2 embodiment of a micro hemispheric resonator gyro.
Figure 2:
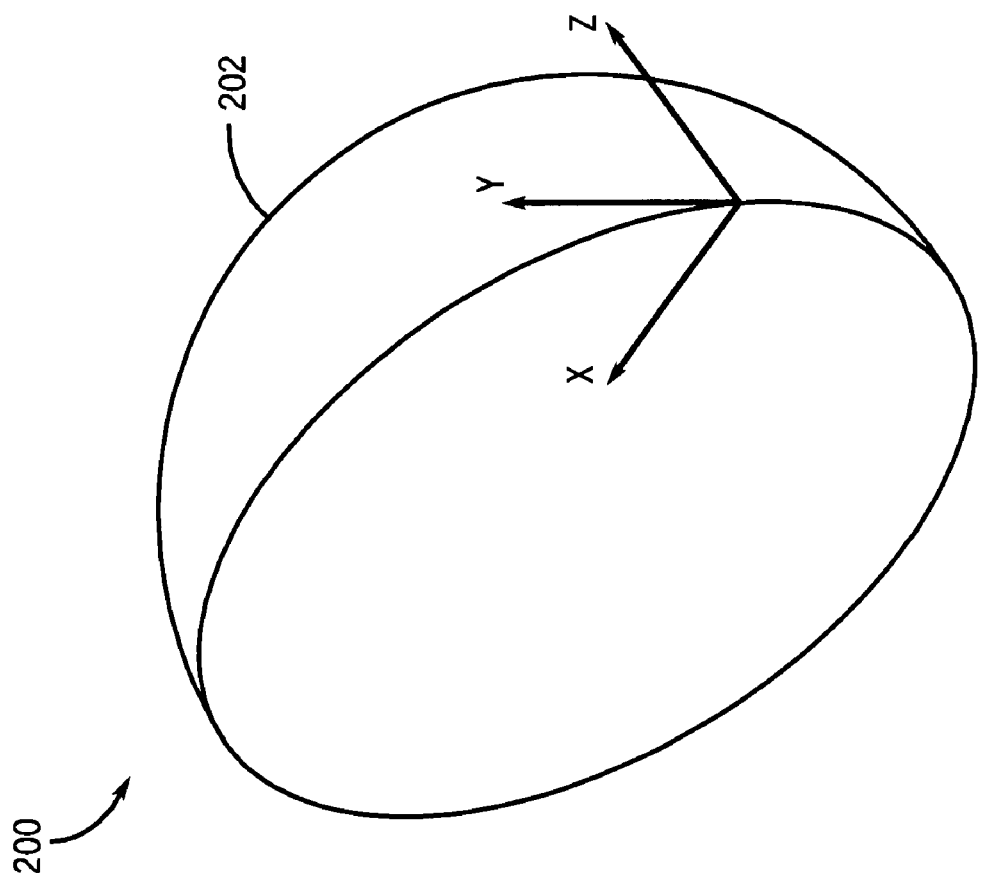
FIG. 2 is a perspective view of an embodiment according to the present method and apparatus of a micro hemispheric resonator gyro.

FIG. 2 is a perspective view of an embodiment according to the present method and apparatus of a hemispheric resonator 200 having a restraint 202. FIG. 3 is another perspective view of an embodiment according to the present method and apparatus of a hemispheric resonator 300 having a restraint 302.

The micro hemispheric resonator gyro 200 may have restraint 202. A modal analysis may be performed by varying diameter, OD: 200, 300, 500:m, and by varying thickness, t: 0.5, 1.5, 3.0:m. In the modal analysis example 9 cases are evaluated, i.e. OD=200:m with 0.5, 1.5, and 3.0:m thicknesses, OD=300:m with 0.5, 1.5, and 3.0:m thicknesses, and OD=500:m with 0.5, 1.5, and 3.0:m thicknesses.

Figure 4:
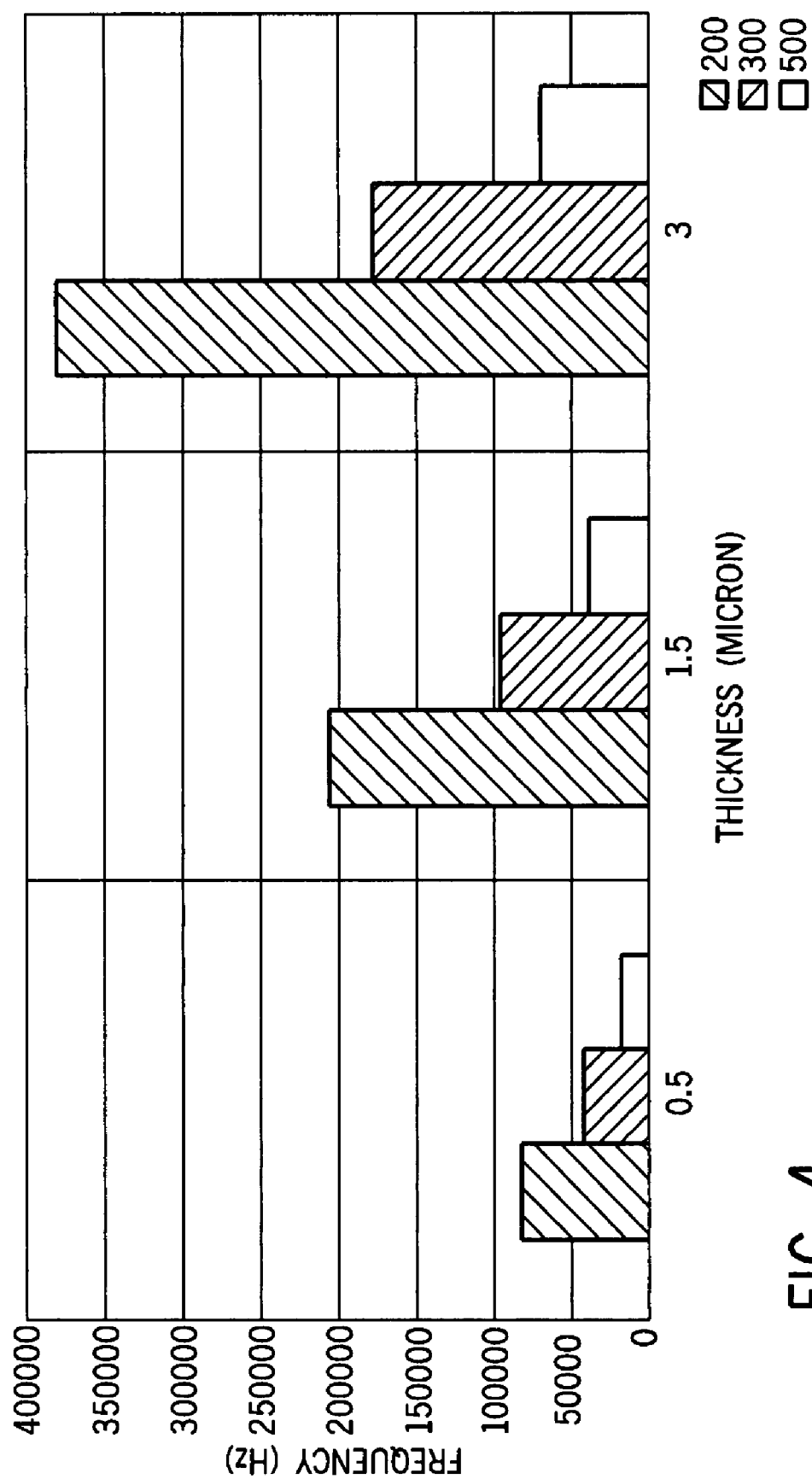
FIG. 4 is a graph depicting the change in frequency as a function of the thickness and diameter of a micro hemispheric resonator gyro according to the present method and apparatus.

FIG. 4 is a graph depicting the change in frequency as a function of the thicknesses and diameters of a micro hemispheric resonator gyro according to the present method and apparatus.

Figure 6:
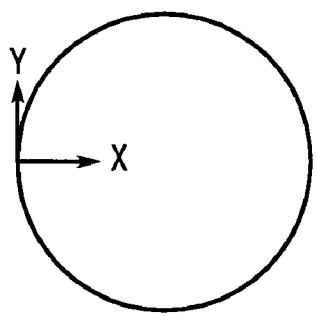
FIGS. 6-10 depict the first five mode shapes for a micro hemispheric resonator gyro according to the present method and apparatus.
Figure 7:
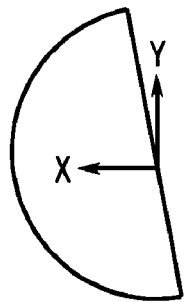
Figure 8:
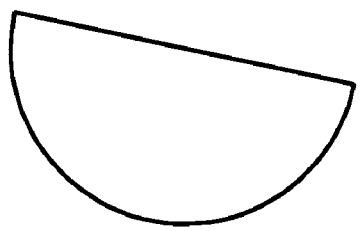
Figure 9:
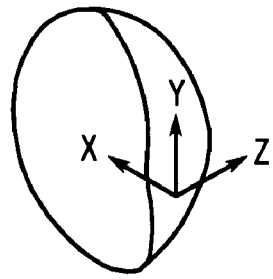
Figure 10:
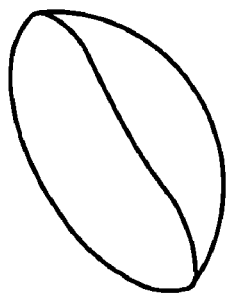

FIG. 5 is a graph depicting the fundamental breathing mode for different thicknesses and diameters of a micro hemispheric resonator gyro according to the present method and apparatus. Nine cases are depicted for the different combinations of the thickness and diameter. FIGS. 6-10 depict the first five mode shapes for a micro hemispheric resonator gyro that has a diameter of 200:m and a thickness of 0.5:m. FIG. 6 depicts a micro hemispheric resonator gyro with F1=37021 Hz (Rotate about Z). FIG. 7 depicts a micro hemispheric resonator gyro with F2=38477 Hz (Rotate about X). FIG. 8 depicts a micro hemispheric resonator gyro with F3=39663 Hz (Rotate about Y). FIG. 9 depicts a micro hemispheric resonator gyro with F4=82432 Hz, Breathing Mode 1. FIG. 10 depicts a micro hemispheric resonator gyro with F5=82687 Hz, Breathing Mode 2.

Figure 11:
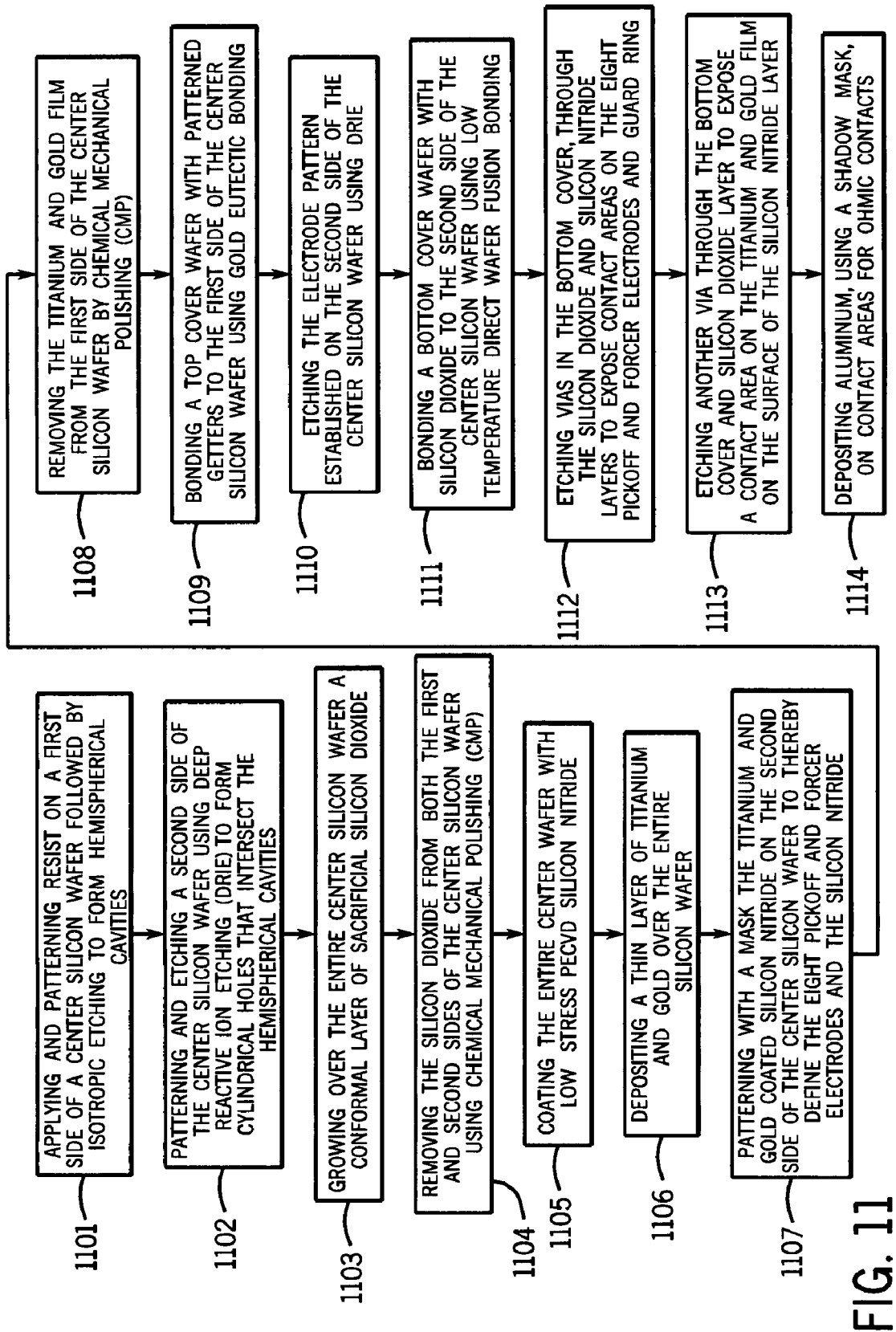
FIG. 11 is a flowchart depicting one embodiment of a method of forming a micro hemispheric resonator gyro according to the present method and apparatus.

FIG. 11 is a flowchart depicting one embodiment of a method of forming a micro hemispheric resonator gyro according to the present method and apparatus.

The fabrication may be done at the wafer level using standard MEMS processes. Fabrication of the center layer, in one example, may begin with the application and patterning resist on the first side of a 3 mm thick silicon wafer followed by isotropic etching to form hemispherical cavities 3 mm in diameter (step 1101). The second side of the center wafer may be patterned and etched using deep reactive ion etching (DRIE) to form cylindrical holes that intersect the hemispherical cavities (step 1102). A conformal 1:m thick layer of sacrificial layer such as silicon dioxide is then grown over the entire wafer (step 1103). The silicon dioxide is removed from both the first and second sides of the center wafer using chemical mechanical polishing (GMP) (step 1104). The entire center wafer is then coated with 3 μm of low stress PECVD silicon nitride (step 1105). Following the silicon nitride a thin layer of titanium and gold (TiAu) is deposited over the entire wafer (step 1106). The thickness of the TiAu film is limited to only what is necessary for electrical conductive in order to minimize the damping that would lower the Q of the resonator. The TiAu coated silicon nitride on the second side of the center wafer is patterned with the mask that will define the eight pickoff and forcer electrodes and the silicon nitride (step 1107). The TiAu film and silicon nitride is removed from the first side by chemical mechanical polishing (CMP) (step 1108). A 300 μm top cover wafer with patterned getters is now bonded to the first side of the center wafer using gold eutectic bonding (step 1109). The electrode pattern established on the second side of the center wafer in now etched using DRIE (step 1110). A 300 μm bottom cover wafer with 1 μm of silicon dioxide is bonded to the second side of the center wafer using low temperature direct wafer fusion bonding (step 1111). Vias are etched in the bottom cover, through the silicon dioxide and silicon nitride layers to expose contact areas on the eight pickoff and forcer electrodes and guard ring (step 1112). Another via is etched through the bottom cover and silicon dioxide layer to expose a contact area on the TiAu film on the surface of the silicon nitride layer (step 1113). A shadow mask is used to deposit aluminum on the contact areas for ohmic contacts (step 1114).

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

I claim:

1. An apparatus, comprising:
   a plurality of pickoff and forcer electrodes;
   a hemispheric resonator;
   a guard ring having first and second opposed sides, the guard ring encompassing the plurality of pickoff and forcer electrodes, and the hemispheric resonator;
   a top cover operatively coupled to the first side of the guard ring; and
   a bottom cover operatively coupled to the second side of the guard ring;
   wherein the plurality of pickoff and forcer electrodes, the guard ring, the top cover and the bottom cover may be formed from single crystal silicon; and
   wherein the plurality of pickoff and forcer electrodes, the hemispheric resonator, the guard ring, the top cover and the bottom cover form a batch-fabricated micro hemispheric resonator gyro.

2. The apparatus according to claim 1, wherein the plurality of pickoff and forcer electrodes comprises eight pickoff and forcer electrodes.

3. The apparatus according to claim 1, wherein the plurality of pickoff and forcer electrodes surround the hemispheric resonator.

4. The apparatus according to claim 1, wherein the micro hemispheric resonator gyro is formed from a high Q material.

5. The apparatus according to claim 4, wherein the high Q material is low stress silicon nitride.

6. The apparatus according to claim 1, wherein the micro hemispheric resonator gyro is composed of first, second and third silicon layers.

7. The apparatus according to claim 6, wherein the first layer is a top layer that contains the top cover and a getter.

8. The apparatus according to claim 6, wherein the second layer is a center layer that contains the guard ring, the plurality of pickoff and forcer electrodes and the hemispheric resonator.

9. The apparatus according to claim 6, wherein the third layer is a bottom layer that contains the bottom cover with vias for electrical contact to the electrodes and the resonator.

10. A batch-fabricated micro hemispheric resonator gyro, comprising:
   at least first, second and third silicon layers;
   the first layer having a top cover;
   the second silicon layer having a plurality of pickoff and forcer electrodes, a hemispheric resonator and a guard ring having first and second opposed sides, the guard ring containing the plurality of pickoff and forcer electrodes, and the hemispheric resonator;
   the third layer having a bottom cover;
   the top cover operatively coupled to the first side of the guard ring;
   the bottom cover operatively coupled to the second side of the guard ring;
   the plurality of pickoff and forcer electrodes, the guard ring, the top cover and the bottom cover being formed from single crystal silicon.

11. The apparatus according to claim 10, wherein the plurality of pickoff and forcer electrodes comprises eight pickoff and forcer electrodes.

12. The apparatus according to claim 10, wherein the plurality of pickoff and forcer electrodes surround the hemispheric resonator.

13. The apparatus according to claim 10, wherein the micro hemispheric resonator gyro is formed from a high Q material.

14. The apparatus according to claim 13, wherein the high Q material is low stress silicon nitride.

15. The apparatus according to claim 10, wherein the top cover has a getter.

16. The apparatus according to claim 10, wherein the bottom cover has vias for electrical contact to the electrodes and the resonator.

* * * * *